Sept. 22, 1959  A. M. CREIGHTON, JR  2,905,206
PATCH FOR REPAIRING LEAK HOLES IN PIPE LINES
AND METHOD FOR APPLYING THE SAME
Filed Nov. 23, 1956
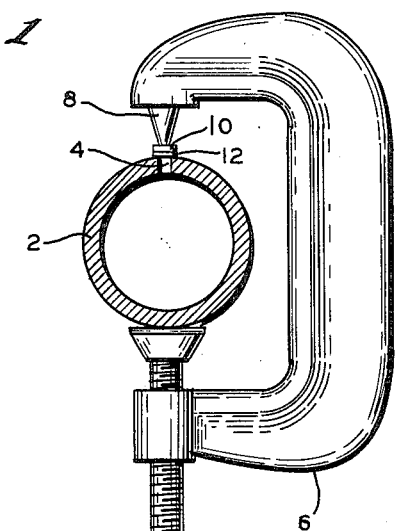
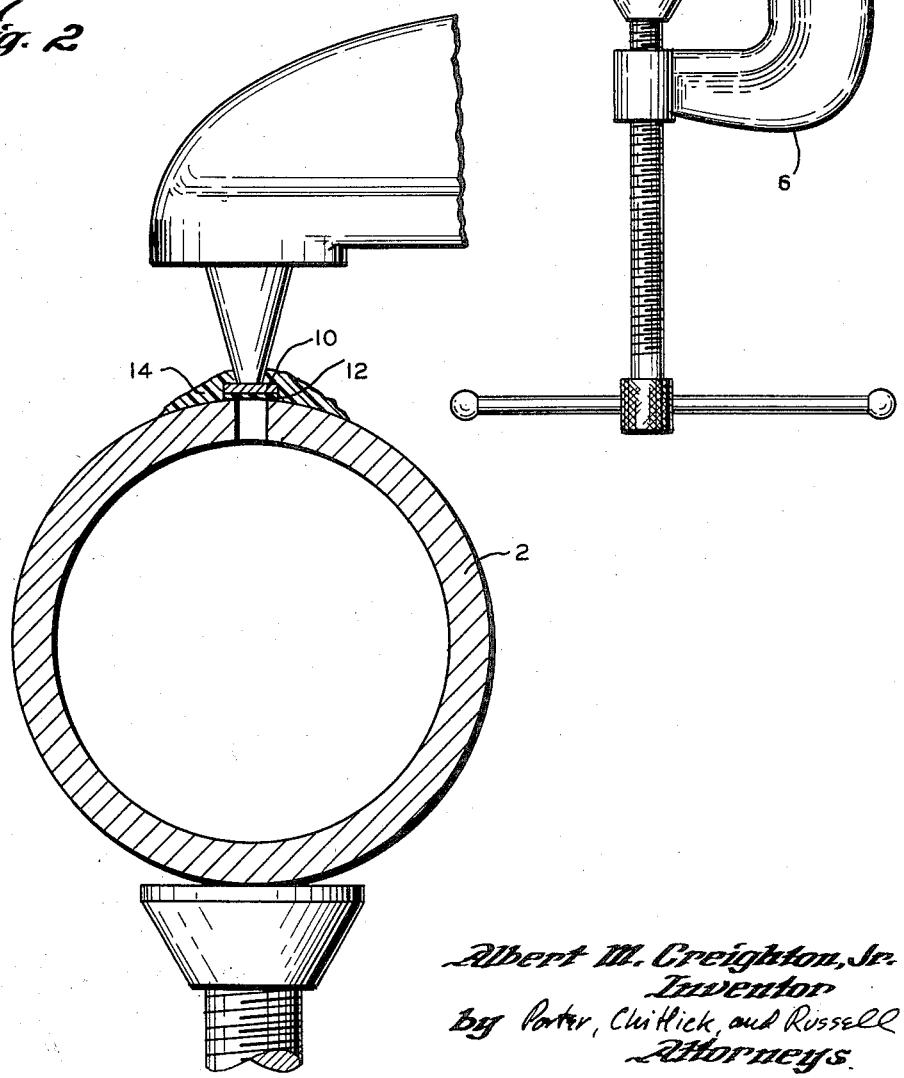
Albert M. Creighton, Jr.
Inventor
by Porter, Chittick, and Russell
Attorneys.

United States Patent Office 2,905,206
Patented Sept. 22, 1959

2,905,206

PATCH FOR REPAIRING LEAK HOLES IN PIPE LINES AND METHOD FOR APPLYING THE SAME

Albert M. Creighton, Jr., Manchester, Mass., assignor to Chemical Development Corporation, Danvers, Mass., a corporation of Massachusetts Application November 23, 1956, Serial No. 624,042

1 Claim. (Cl. 138—99)

This invention relates to repairing fluid containers and more particularly to repairing leaks in high pressure pipe lines without closing off the line pressure. In one aspect the invention relates to the structural repair elements in combination, and in another aspect it relates to the method for making the repairs.

The problem of leakage from pipe lines exists in every industry where fluids are conveyed through pipe lines under pressure. This problem is especially acute and bothersome in the case of oil refining and transmission companies, water companies, power plants, paper mills, and various other types of installations. The problem is bothersome because of loss of expensive fluids, the necessity of terminating fluid flow until the repair is made, the need for replacing defective portions of the line, and the substantial time and labor expended in repairing the leak.

Accordingly the object of this invention is to provide a novel patch for repairing a leaking pipe line without replacing the defective portion of the line, and a method for applying the same.

Another specific object of this invention is to provide a method for repairing small leak holes in pipe lines without closing off the line pressure.

A more specific object of this invention is to provide a method for rapidly, easily and inexpensively repairing leak holes in pipe lines with a plastic mending composition.

Many other objects and many attendant features of this invention will be readily appreciated from the following description when considered together with the accompanying drawings wherein:

Fig. 1 is an elevational view partly in section showing how a metal patch piece is temporarily secured over a leak hole in a pipe line by means of a C clamp specially adapted to carry out the method of the present invention; and Fig. 2 illustrates how the metal patch piece is permanently secured to the pipe line by means of a trowelable or semi-viscous plastic repair material that hardens into a strong mass that coheres firmly to the metal patch piece and the pipe line.

The method of this invention comprises the steps of placing a patch piece over the leak hole in a pipe line, holding the patch piece in place under pressure applied to the patch over a relatively small portion of its area, applying a release agent only to the patch holding mechanism, applying a plastic repair material over and around the patch piece while it is still under pressure, allowing the plastic material to harden into a strong mass that is in firm cohesion with the pipe line and the patch piece while the pressure is still applied, and removing the pressure after the plastic material has hardened.

In order to execute this method it is necessary to use a plastic material that will adhere to the pipe line to be prepared, and hardens into a solid mass that is relatively inert and impervious, and has high tensile, compressive and flexural strengths.

It has been found that plastic repair material of the type comprising finely divided metal and an epoxy resin are ideally suitable for the purpose at hand, although other types of plastic materials capable of adhering to metals and of hardening to a solid impervious mass having high tensile, compressive and flexural strength may be used in the practice of this invention. For instance, plastics of the polyvinyl chloride-acetate group and polyesters may be employed in some applications. The epoxy resins may be condensation products of an epihalogenohydrin such as 1-chloro-2,3 epoxypropane and a bis-phenol such as bis (4-hydroxyphenyl) dimethyl methane. Alternatively the epoxy resin may be the reaction product of a diphenol and a diglycidylether of a diphenol. Various resins of this type suitable for the purposes of the present invention are disclosed in the U.S. Patent No. 2,506,486 to Howard L. Bender and Alford G. Farnham. The type of filler employed is not critical so long as it has inherent strength and is compatible with the binder.

A plastic repair material found to be particularly suitable to repair leak holes in high pressure pipe lines is "Devcon," a product of Chemical Development Corporation of Danvers, Massachusetts. "Devcon" is especially suitable because of its high strength and stability. This product as applied comprises an epoxy resin which is a condensation product of an epihalogenohydrin and a bis-phenol, finely divided particles of steel, a curing agent which is a mild base such as diethylene triamine, a thickening agent such as amorphous silica or finely divided carbon black, and an internal plasticizer such as poly-amid. The resin-steel mixture is about 20% resin and about 80% steel. The resin and steel particles are packaged together separately from the curing and thickening agents which are also packaged together. The curing agent-thickening agent mixture is added to the resin-steel mixture when it is to be used. The curing agent causes the resin to polymerize and set into a strong, impervious and inert mass in about 45 minutes to an hour at 70° F. This time can be reduced to a half hour or less by heating the plastic mass.

The method of the present invention is described hereinafter using the aforesaid "Devcon" as the repair material.

Looking now to the drawings, let it be assumed that while oil or some other chemical is being conveyed under pressure through a steel pipe line 2, a leak hole 4 develops in the wall of the pipe. Such a leak hole may be the result of corrosion, a heavy blow with a sharp object, or an inherent structural weakness. Unless the leak hole is plugged immediately substantial amounts of oil will be lost and a fire hazard may result. In repairing the leak according to the method of the present invention, recourse is hand to a C clamp 6 to which has been welded a tapered steel rod 8, and a piece of steel 10 preferably lined on one side with a relatively soft gasket member 12. The piece of steel should be made as small as possible, but still large enough and thick enough to cover the leak hole and hold back the pressure in the line. The steel piece 10 is placed over the hole with its rubber surface engaging the pipe. Then the C clamp is placed about the pipe with the point of its tapered rod 8 in engagement with the steel patch member 10. The clamp is tightened until the leak stops. All moisture, dirt and oil is wiped from the patch piece and the pipe. Then a suitable mold release agent is applied to the tapered rod of the clamp so as to facilitate later removal of the clamp. Various release agents may be used, depending upon the particular plastic repair material to be used. For "Devcon" various forms of grease or silicone oil may be employed. Thereafter with the curing agent having been added to the epoxy resin-steel mixture to form a trowelable or semi-viscous substance, the "Devcon" is applied over the steel patch and onto the pipe as at 14 and allowed to harden completely. Gentle heat may be applied if speed is essential. Where the fluid being conveyed in the pipe line is combustible, care should be taken to make certain that the pipe and the surrounding area has been wiped dry and that the temperature to which the repaired sections of the pipe line is heated is not excessive. An infra red lamp is a suitable source of heat. Once the "Devcon" has hardened completely, the C clamp is loosened and removed. This is accomplished without difficulty due to the rod 8 having been coated previously with a mold release agent.

The foregoing method of repairing a pipe line may be executed in most cases without shutting off the line pressure. However, to avoid excessive leakage of fluid or to avoid danger to the repairman where the fluid is poisonous, caustic or otherwise harmful, it may be expedient to shut off the pressure while the pipe line is being repaired. It has been found that a single workman will experience little difficulty in applying the steel patch to a leak hole in a pipe line without shutting off the pressure where the hole is ¼″ or smaller.

It is to be understood that where the leak takes the form of a longitudinal crack rather than a hole, it is preferred to use a C clamp having a flat tapered plate in place of rod 8 since the plate makes it possible to apply pressure evenly along the length of the steel patch which necessarily must be as long as the crack.

For maximum adhesion it has been found advisable to roughen the surface of the pipe line with a file.

Obviously many modifications and variations of the present invention are possible in the light of the above teachings. Therefore, it is to be understood that the invention is not limited in its application to the details and arrangement specifically described or illustrated, and that within the scope of the appended claims it may be practiced otherwise than as specifically described or illustrated.

I claim:

A patch for a leak in a fluid container comprising in combination a patch member of sheet material of sufficient strength to withstand normal fluid pressures in said container, a gasket, said gasket covering said leak, said patch member resting on said gasket and being substantially coextensive therewith, said gasket further having a substantial thickness whereby it supports the margins of said patch member in spacial relationship with the adjacent outer surface of said container, and means for sealing the margins of said patch member to the said surface of said container comprising a resin selected from a group of hard, tough, strong and highly adhesive resins together with a polyamid as a internal plasticizer whereby said sealing means yields with minute relative motion between said patch and container and effectively distributes the pressure load under said patch member across the area of said sealing means.

References Cited in the file of this patent

UNITED STATES PATENTS

| 1,285,210 | Jones | Nov. 19, 1918 |
| 2,236,913 | Merrill | Apr. 1, 1941 |
| 2,325,417 | Merrill et al. | July 27, 1943 |
| 2,575,558 | Newey et al. | Nov. 20, 1951 |
| 2,581,015 | Graham | Jan. 1, 1952 |

FOREIGN PATENTS

| 757,735 | Great Britain | Sept. 26, 1956 |